United States Patent [19]

Ikeda et al.

[11] Patent Number: 5,737,713

[45] Date of Patent: Apr. 7, 1998

[54] TRACTION CONTROL SYSTEM FOR VEHICLE

[75] Inventors: Toru Ikeda; Fumiaki Honjyo; Shuji Shiraishi, all of Saitama; Osamu Yano, Tochigi, all of Japan

[73] Assignee: Honda Giken Kogyo Kabushiki Kaisha, Tokyo, Japan

[21] Appl. No.: 610,615

[22] Filed: Mar. 4, 1996

[30] Foreign Application Priority Data

Mar. 2, 1995 [JP] Japan ................................ 7-042644

[51] Int. Cl.$^6$ .................................... B60K 28/16
[52] U.S. Cl. .................................... 701/84; 180/197
[58] Field of Search .................. 364/426.027, 426.028, 364/426.029, 426.031, 426.032, 426.034, 426.035, 424.098; 180/197

[56] References Cited

U.S. PATENT DOCUMENTS

| | | | |
|---|---|---|---|
| 4,962,824 | 10/1990 | Hagiya et al. | 180/197 |
| 4,967,866 | 11/1990 | Maehara | 180/197 |
| 4,971,164 | 11/1990 | Fujita et al. | 180/197 |
| 5,002,148 | 3/1991 | Miyake et al. | 364/426.031 |
| 5,137,105 | 8/1992 | Suzuki et al. | 364/426.031 |
| 5,159,990 | 11/1992 | Abe et al. | 180/197 |
| 5,270,930 | 12/1993 | Ito et al. | 364/424.098 |

FOREIGN PATENT DOCUMENTS 5-214974   8/1993   Japan .

*Primary Examiner*—Gary Chin
*Attorney, Agent, or Firm*—Armstrong, Westerman, Hattori, McLeland & Naughton

[57] ABSTRACT

In a traction control system, an initial engine torque for a traction control is selected from the following engine torques: an engine torque calculated from a throttle opening degree and an engine revolution-number; a required engine torque calculated from a total acceleration and a vehicle speed; and an engine torque corresponding to a road surface of an extremely low friction coefficient, depending upon a slipping state determined by comparing a driven wheel speed with slip reference values. When the driven wheel speed repeatedly exceeds the slip reference value, it is determined that a hunting has been generated, and the engine torque corresponding to the road surface of the extremely low friction coefficient is selected, and the engine torque is largely reduced. Thus, when the friction coefficient of the road surface is low, the driven wheel speed is prevented from hunting.

6 Claims, 4 Drawing Sheets

FIG.2

M11 Engine torque reducing means
↑ ACCD
M10 Torque drop amount calculating means
↑ TQINT
M8 Initial engine torque selecting means
↑ TQLM
↑ TQE
M3 Engine torque calculating means
↑ DEGTH1
↑ NEL ← TQD
M5 Required engine torque calculating means
↑ GEARP
↑ TG
M4 Total acceleration calculating means
↑ FG
↑ LG M7 Comparing means
↑ M6 VR1, VR2
M6 Slip reference value calculating means
↑ VV
M2 Vehicle speed calculating means
↑ VVRR
↑ VVRL → VR2
M9 Hunting determining means
↑ VW
M1 Driven wheel speed calculating means
↑ VWFR
↑ VWFL

TRACTION CONTROL SYSTEM FOR VEHICLE

BACKGROUND OF THE INVENTION

1. Field of the Invention

The present invention relates to a traction control system for a vehicle, including a driven wheel speed calculating means for calculating a driven wheel speed of the vehicle, a vehicle speed calculating means for calculating a vehicle speed, a slip reference value calculating means for calculating a slip reference value of a driven wheel based on the vehicle speed, a comparing means for comparing the driven wheel speed and the slip reference value with each other, and an engine torque reducing means for feed-back control of the engine torque to prevent an excessive slipping of the driven wheel, when the driven wheel speed exceeds the slip reference value.

2. Description of the Related Art

There is such a conventionally known traction control system for the vehicle, in which either one of a value resulting from conversion of a primary filtered value of an engine torque currently output by an engine into a throttle opening degree and a value resulting from conversion of a required engine torque determined from an acceleration resistance, a rolling resistance and an air resistance into a throttle opening degree, is selected as an initial throttle opening degree, and the initial throttle opening degree is determined as an initial value at the start of the feed-back control of a throttle valve (see Japanese Patent Application Laid-open No. 214974/93).

In the known traction control system, the control of slipping of the driven wheels is carried out, in consideration of the friction coefficient of a road surface, by selecting the value resulting from conversion of the required engine torque into the initial throttle opening degree as the initial throttle opening degree. However, there is a possibility that a, so-called, hunting phenomenon, causing the driven wheel speed to be repeatedly increased and decreased at a short cycle and, not converged, may be generated due to an estimation error of the road surface friction coefficient or the like, resulting in degraded starting performance and drive feeling.

SUMMARY OF THE INVENTION

Accordingly, it is an object of the present invention to prevent the hunting of the driven wheel speed, during starting and sudden acceleration of the vehicle.

To achieve the above object, according to a first aspect and feature of the present invention, there is provided a traction control system for a vehicle, comprising: a driven wheel speed calculating means, for calculating a driven wheel speed of the vehicle; a vehicle speed calculating means, for calculating a vehicle speed; a slip reference value calculating means, for calculating a slip reference value of a driven wheel based on the vehicle speed; a comparing means, for comparing the driven wheel speed and the slip reference value with each other; and an engine torque reducing means, for feed-back control of the engine torque to prevent an excessive slipping of the driven wheel, when the driven wheel speed exceeds the slip reference value, wherein the traction control system further includes, a required-engine torque calculating means, for calculating a required engine torque based on the driving state of the vehicle; a hunting determining means, for determining a hunting of the driven wheel speed based on the number of times when the driven wheel speed has become lower than a predetermined threshold value after becoming higher than the predetermined threshold value; and an initial engine torque selecting means, which outputs the required engine torque as an initial engine torque at the start of the feed-back control to the engine torque reducing means, when the hunting is not determined by the hunting determining means, and which outputs an engine torque, smaller than the required engine torque, as the initial engine torque, at the start of the feed-back control to the engine torque reducing means, when the hunting is determined by the hunting determining means.

With the first feature of the present invention, when no hunting of the driven wheel speed is generated, the required engine torque is selected, as the initial engine torque, to start the engine torque reducing control. When the hunting of the driven wheel speed is generated, the engine torque, smaller than the required engine torque, is selected as the initial engine torque to start the engine torque reducing control. Thus, it is possible to promptly converge the hunting of the driven wheel speed. The hunting of the driven wheel speed is determined, based on the number of times when the driven wheel speed has become higher than the predetermined threshold value, after becoming lower than the predetermined threshold value.

According to a second aspect and feature of the present invention, in addition to the first feature, the traction control system further includes a total acceleration calculating means, for calculating a total acceleration, based on a longitudinal acceleration and a lateral acceleration of the vehicle, and the required engine torque is calculated, based on the total acceleration, an air resistance and a rolling resistance of the vehicle.

With the second feature of the present invention, the required engine torque can be calculated accurately.

According to a third aspect and feature of the present invention, in addition to the first feature, in place of the hunting determining means, there is employed a hunting determining means which determines the hunting of the driven wheel speed, based on a band pass filter value of the driven wheel speed.

With the third feature of the present invention, the hunting of the driven wheel speed can be determined accurately, based on the value resulting from the processing of the driven wheel speed by the band pass filter.

According to a fourth aspect and feature of the present invention, in addition to the first feature, in place of the hunting determining means, there is employed a hunting determining means which determines the hunting of the driven wheel speed, based on the number of times when a time differentiation value of the driven wheel speed has become smaller than a predetermined threshold value after becoming larger than the predetermined threshold value.

With the fourth feature of the present invention, the hunting of the driven wheel speed can be determined accurately, based on the number of times when the time differentiation value of the driven wheel speed has become smaller then a predetermined threshold value after becoming larger than the predetermined threshold value.

According to a fifth aspect and feature of the present invention, in addition to the first feature, the engine torque, smaller than the required engine torque, is determined in accordance with an extremely low friction coefficient of a road surface.

With the fifth feature of the present invention, even on the road surface of the extremely low friction coefficient, the hunting can be converged promptly.

According to a sixth aspect and feature of the present invention, in addition to the first feature, the traction control system further includes an engine torque calculating means, for calculating the engine torque based on the throttle opening degree and the number of revolutions of the engine, and wherein when the driven wheel speed is between the slip reference value and another slip reference value, which is smaller than the former slip reference value, the initial engine torque selecting means selects the lower one of the engine torque, calculated by the engine torque calculating means, and the required engine torque, calculated by the required-engine torque calculating means.

With the sixth feature of the present invention, when the slip amount of the driven wheels is relatively small, the slipping of the driven wheels can be inhibited with little influencing on the behavior of the vehicle.

The above and other objects, features and advantages of the invention will become apparent from the following detailed description of a preferred embodiment taken in conjunction with the accompanying drawings.

BRIEF DESCRIPTION OF THE DRAWINGS

FIG. 2 is a block diagram of the control system;

DETAILED DESCRIPTION OF THE PREFERRED EMBODIMENT

The present invention will now be described, by way of a preferred embodiment, with reference to the accompanying drawings.

Figure 1:
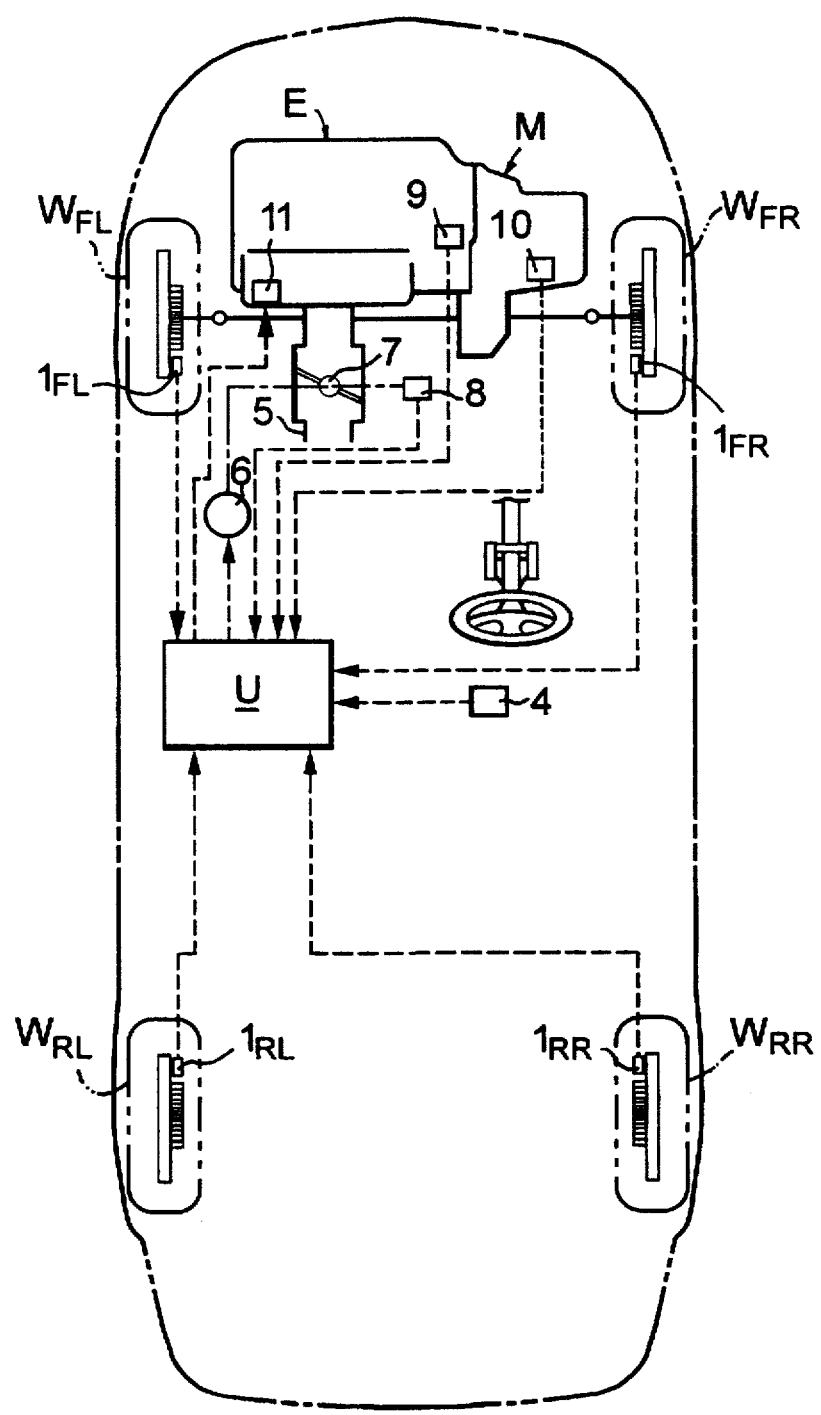
FIG. 1 is a diagrammatic illustration of the arrangement of a vehicle equipped with a traction control system.

FIG. 1 shows a front wheel drive vehicle. The vehicle includes a pair of left and right driven wheels $W_{FL}$ and $W_{FR}$, driven by an engine E, and a pair of follower wheels $W_{RL}$ and $W_{RR}$. Driven wheel speed defecting means $1_{FL}$ and $1_{FR}$ are mounted on the driven wheels $W_{FL}$ and $W_{FR}$, and follower wheel speed detecting means $1_{RL}$ and $1_{RR}$ are mounted on the follower wheels $W_{RL}$ and $W_{RR}$, respectively.

Figure 3:
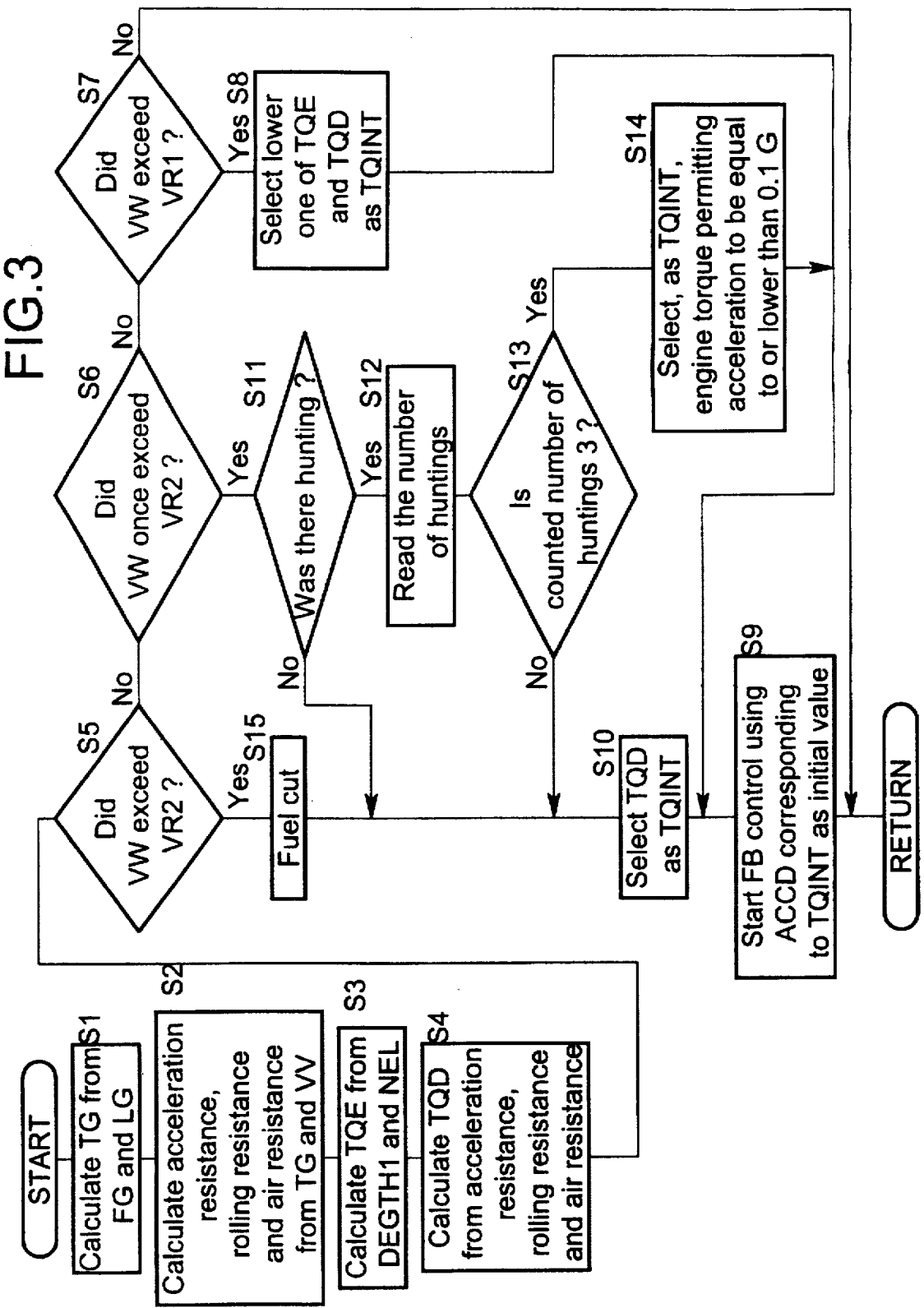
FIG. 3 is a flow chart for explaining operation of such control system.

A lateral acceleration detecting means 4, for detecting a lateral acceleration LG, is mounted in place on a vehicle body. A throttle valve 7 is mounted in an intake passage 5 in the engine E and connected to, and opened and closed by, a pulse motor 6. An opening degree DEGTH1, FIGS. 2 and 3, of the throttle valve 7 is detected by a throttle opening degree detecting means 8, FIG. 1. An engine revolution-number detecting means 9, for detecting a number NEL, FIGS. 2 and 3, of revolutions of the engine E is mounted in the engine E. A shift position detecting means 10, for detecting a shift position GEARP, FIGS. 2 and 3, is mounted in a transmission M, FIG. 1. Further, an injected fuel amount control device 11 is mounted in the engine E to effect cutting-off of fuel.

Signals from the driven wheel speed detecting means $1_{FL}$ and $1_{FR}$, the follower wheel speed detecting means $1_{RL}$ and $1_{RR}$, the lateral acceleration detecting means 4, the throttle opening degree detecting means 8, the engine revolution-number detecting means 9 and the shift position detecting means 10 are input to and mathematically processed in an electronic control unit U, FIG. 1, including a microcomputer. On the basis of the results of the mathematic processing, the electronic control unit U drives the pulse motor 6 and/or the injected fuel amount control device 11 to reduce the output from the engine E in order to inhibit excessive slipping of the driven wheels $W_{FL}$ and $W_{FR}$.

FIG. 2 is a block diagram showing the outline of a traction control system. The output signals VWFL and VWFR, FIG. 2, from the left and right driven wheel speed detecting means $1_{FL}$ and $1_{FR}$, FIG. 1, are input to a driven wheel speed calculating means M1, where a driven wheel speed VW is calculated as an average value of the output signals VWFL and VWFR from the left and right driven wheel speed detecting means $1_{FL}$ and $1_{FR}$. The output signals VVRL and VVRR, FIG. 2, from the left and right follower wheel speed detecting means $1_{RL}$ and $1_{RR}$, FIG. 1, are input to a vehicle speed calculating means M2, where a vehicle speed VV is calculated as an average value of the output signals VVRL and VVRR from the left and right follower wheel speed detecting means $1_{RL}$ and $1_{RR}$.

A throttle opening degree DEGTH1, FIG. 2, detected by the throttle opening degree detecting means 8 and a number NEL of revolutions of the engine detected by the engine revolution-number detecting means 9, FIG. 1, are input to an engine torque calculating means M3, where an engine torque TQE, FIG. 2, output by the engine E, is calculated by a method such as a map-searching, based on the throttle opening degree DEGTH1 and the number NEL of revolutions of the engine. The engine torque TQE is subjected to the following first order lag filtering:

$$TQE = (1-K) \times TQE(n-1) + K \times TQE(n)$$

wherein K is a first order lag filter factor.

Figure 4:
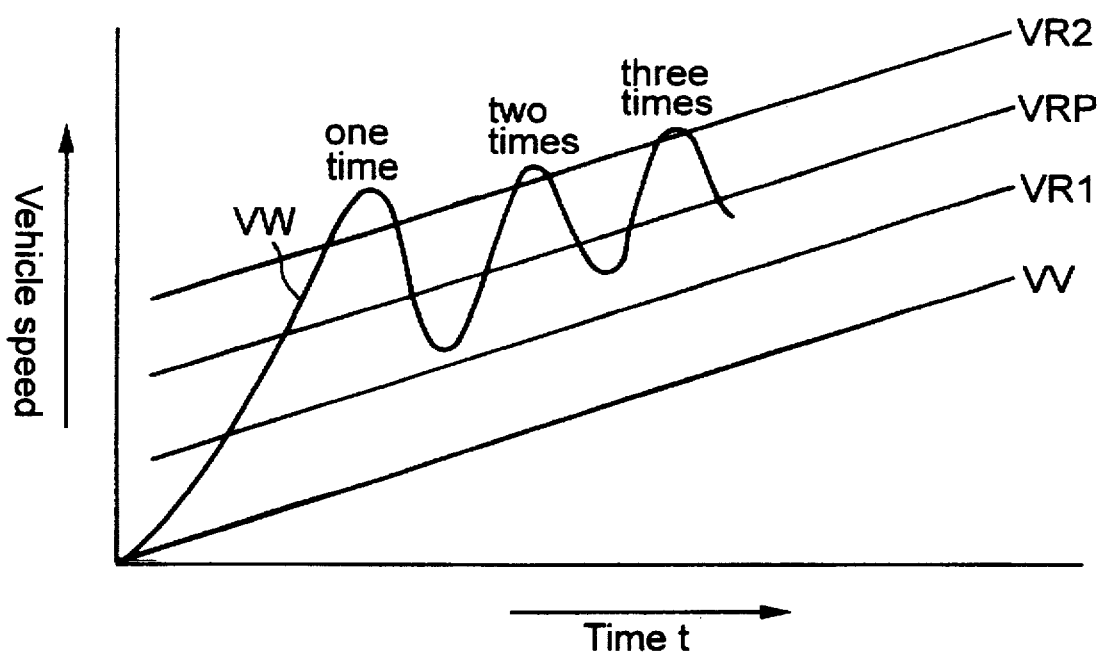
FIG. 4 is a graph for explaining the hunting determining technique.

A longitudinal acceleration FG of the vehicle body, determined from a time differentiation value of the vehicle speed VV and a lateral acceleration LG, detected by the lateral acceleration detecting means 4, FIG. 1, are input to a total acceleration detecting means M4, where a total acceleration TG is calculated as a vector sum of the longitudinal acceleration FG and the lateral acceleration LG. The total acceleration TG, the vehicle speed VV and the shift position GEARP, FIG. 2, detected by the shift position detecting means 10, FIG. 1, are input to a required-engine torque calculating means M5, where an engine torque TQD, required to overcome an acceleration resistance, a rolling resistance and an air resistance is calculated according to the following equation:

$$QD = (Ra + Rr + R1) \times DLR \times K1/nt$$

wherein Ra=TG×WF
 Rr=μr×W
 R1=μ1×A×VV²
 Ra: acceleration resistance
 Rr: rolling resistance
 R1: air resistance
 W: weight of vehicle
 WF: weight of driven wheel axle
 μr: rolling resistance factor
 μ1: air resistance factor
 A: frontal projected area
 DLR: tire dynamic load radius
 K1: excess driving force factor
 nt: gear ratio A slip reference value calculating means M6, FIG. 2, calculates a first slip reference value VR1 and a second slip reference value VR2, based on the vehicle speed VV (see FIG. 4). The first slip reference value VR1 is set at a value larger than the vehicle speed VV by a predetermined value, end the second slip reference value VR2 is set at a value larger than the first slip reference value VR1 by a predetermined value.

A comparing means M7, FIG. 2, compares the first slip reference value VR1 and the second slip reference value VR2 with the driven wheel speed VW. If the driven wheel speed VW exceeds the second slip reference value VR2, it is determined that the slip amount of the driven wheels $W_{FL}$ and $W_{FR}$ is large. If the driven wheel speed VW exceeds the first slip reference value VR1 and does not exceed the second slip reference value VR2, it is determined that the slip amount of the driven wheels $W_{FL}$, and $W_{FR}$ is small.

A hunting determining means M9, FIG. 2, compares the second slip reference value VR2 with the driven wheel speed VW. The number of times when the driven wheel speed VW has become lower than the second slip reference value VR2, after becoming higher than the second slip reference value VR2, is counted by a counter. If the number of times reaches, for example, three, it is determined that the driven wheel speed VW is hunting.

The engine torque TQE, the required engine torque TQD and an extremely low friction coefficient road surface engine torque TQLM, FIG. 2, corresponding to an extremely low friction coefficient road surface on which the total acceleration TG is equal to or smaller than 0.1 G, are input to an initial engine torque selecting means M8, where either one of the three engine torques TQE, TQD and TQLM is selected, based on outputs from the comparing means M7 and the hunting determining means M9.

The selected engine torque TQE, TQD or TQLM is converted into a torque drop amount ACCD, FIG. 2, of the engine in a torque drop amount calculating means M10. An engine torque reducing means M11 (specifically, the pulse motor 6, for controlling the throttle valve 7, and/or the injected fuel amount control device 11, for reducing the amount of fuel supplied or to cut off the supply of fuel) reduces the torque of the engine E in accordance with the torque drop amount ACCD.

The above-described operation will be further described in connection with the flow chart shown in FIG. 3.

First, at step S1, a total acceleration TG is calculated based on the longitudinal acceleration FG and the lateral acceleration LG, and at step S2, an acceleration resistance, a rolling resistance and an air resistance are calculated based on the total acceleration TG, the vehicle speed W and the like. Then, at step S3, an engine torque TQE is calculated based on the throttle opening degree DEGTH1 and the engine revolution-number NEL. At step S4, a required engine torque TQD is calculated based on the acceleration resistance, the rolling resistance and the air resistance.

Then, the driven wheel speed VW is compared with the first and second reference values VR1 and VR2. If the driven wheel speed VW is not larger than the first reference value VR1 and the slip amount of the driven wheels WFL and WFR is extremely small (i.e., if the answers at steps S5, S6 and S7 are all NO), an engine torque reducing control is not carried out.

If the driven wheel speed VW is between the first and second reference values VR1 and VR2, and the slip amount of the driven wheels WFL and WFR is relatively small (i.e., if the answers at steps S5 and S6 are NO and the answer at step S7 is YES), smaller one of the engine torque TQE and the required engine torque TQD is selected as an initial engine torque TQINT at step S8. Then, at step S9, the pulse motor 6 is driven based on the torque drop amount ACCD corresponding to the low selected value, thereby controlling the throttle valve 7 into its closed state to reduce the engine torque, such that the driven wheel speed VW is converged into a target driven wheel speed VRP (see FIG. 4).

In this manner, a sudden change in engine torque can be prevented, changing-over to a traction control, without affecting the behavior of the vehicle almost at all, by selecting the lower one of the engine torque TQE end the required engine torque TQD as the initial engine torque TQINT and reducing the engine torque.

On the other hand, if the driven wheel speed VW is larger than the second slip reference value VR2 and the slip amount of the driven wheels $W_{FL}$ and $W_{FR}$ is relatively large (i.e., if the answer at step S5 is YES), the supply of fuel is first cut off at step S15 and then, the required engine torque TQD is selected as the initial engine torque TQINT at step S10. And at step 9, the injected fuel amount control device 11 is driven based on the torque drop amount ACCD corresponding to the initial engine torque TQINT, thereby reducing the engine torque to converge the driven wheel speed VW into the target driven wheel speed VRP.

In this manner, by selecting the required engine torque TQD as the initial engine torque TQINT and reducing the engine torque, the vehicle can be accelerated to the maximum without generating an excessive slipping of the driven wheels $W_{FL}$ and $W_{FR}$. Moreover, the engine torque can be controlled to be reduced with a high responsiveness to promptly converge the excessive slipping of the driven wheels WFL and WFR by using the injected fuel amount control device 11 which is capable of promptly reducing the engine torque, as compared with the throttle valve 7.

When the driven wheel speed VW becomes lower than the second slip reference value VR2 by reducing the engine torque by the injected fuel amount control device 11, after the driven wheel speed VW once becomes higher than the second slip reference value VR2 (i.e., if the answer at step S5 is NO and the answer at step S6 is YES), it is determined et step S11 whether a hunting of the driven wheel speed VW has been produced.

More specifically, if the friction coefficient of a road surface is extremely small, the driven wheel speed VW may repeatedly become higher than the second reference value VR2 to hunt and may be difficult to be converged into the target driven wheel speed VRP in some cases. However, when the driven wheel speed VW becomes higher than the second reference value VR2 only one time, it is determined that there is no hunting, the processing is advanced to step S10.

If the driven wheel speed VW becomes higher than the second reference value VR2 a plurality of times at step S11, it is determined that there are huntings. The number of huntings counted by the counter is read at step S12. If the counted number reaches, for example, three, the processing is advanced to step S14. The extremely low engine torque TQLM is selected as the initial engine torque TQINT at step S14, such that the acceleration of the vehicle is equal to or lower than 0.1 G, and the engine torque is reduced by driving the injected fuel amount control device 11 at step S9.

When the driven wheel speed VW is hunting on a road surface of an extremely low friction coefficient, the engine torque can be largely reduced to promptly finish the hunting of the driven wheel speed VW by bringing the initial engine torque TQINT into a value corresponding to the extremely low friction coefficient of the road surface in which the acceleration of the vehicle becomes 0.1 G or less.

Although the embodiment of the present invention has been described in detail, it will be understood that the present invention is not limited to the above-described embodiment, and various modifications in design may be made without departing from the spirit and scope of the invention defined in claims.

For example, the determining means M9 for determining the hunting of the driven wheel speed VW may be constructed in the following manner. That is, the driven wheel speed VW is processed by a band pass filter permitting the passing of a hunting frequency (of about 10 Hz), and if such a filtered value exceeds a reference value, it can be determined that the hunting has been generated. Further, a time differentiation value dVW/dt of the driven wheel speed VW is calculated, and if the time differentiation value dVW/dt exceeds a predetermined value a predetermined number of times, it can be determined that the hunting has been generated.

In the described embodiment, the engine torque is reduced by controlling the throttle opening degree. But the engine torque may be reduced by controlling the amount of fuel injected, or by controlling both the throttle opening degree and the amount of fuel injected. The control of the throttle opening degree is excellent in convergence, and the control of the amount of fuel injected is excellent in responsiveness.

Although the required engine torque TQD is calculated based on the acceleration resistance, the rolling resistance and the air resistance in the embodiment, the required engine torque TQD may be calculated, for example, based on the friction coefficient of a road surface.

What is claimed is:

1. A traction control system for a vehicle, comprising:
    a driven wheel speed calculating means for calculating a driven wheel speed of the vehicle;
    a vehicle speed calculating means for calculating a vehicle speed;
    a slip reference value calculating means for calculating a slip reference value of a driven wheel based on said vehicle speed;
    a comparing means for comparing said driven wheel speed and said slip reference value with each other; and
    an engine torque reducing means for feed-back control of the engine torque to prevent an excessive slipping of the driven wheel, when said driven wheel speed exceeds said slip reference value, wherein
    said traction control system further includes,
        a required-engine torque calculating means for calculating a required engine torque based on the driving state of the vehicle;
        a hunting determining means for determining a hunting of the driven wheel speed based on the number of times when said driven wheel speed has become lower than a predetermined threshold value after becoming higher than the predetermined threshold value; and
        an initial engine torque selecting means, which outputs said required engine torque, as an initial engine torque at the start of the feed-back control to said engine torque reducing means, when the hunting is not determined by said hunting determining means, and which outputs an engine torque smaller than said required engine torque, as the initial engine torque at the start of the feed-back control to said engine torque reducing means, when the hunting is determined by said hunting determining means.

2. A traction control system for a vehicle according to claim 1, further including a total acceleration calculating means for calculating a total acceleration, based on a longitudinal acceleration and a lateral acceleration of the vehicle; and wherein said required engine torque is calculated, based on said total acceleration, an air resistance and a rolling resistance of the vehicle.

3. A traction control system for a vehicle according to claim 1, wherein said hunting determining means determines the hunting of the driven wheel speed based on a band pass filter value of the driven wheel speed.

4. A traction control system for a vehicle according to claim 1, wherein said hunting determining means determines the hunting of the driven wheel speed based on the number of times when a time differentiation value of the driven wheel speed has become smaller than a predetermined threshold value after becoming larger than the predetermined threshold value.

5. A traction control system for a vehicle according to claim 1, wherein said engine torque smaller than said required engine torque is determined in accordance with an extremely low friction coefficient of a road surface.

6. A traction control system for a vehicle according to claim 1, further including an engine torque calculating means for calculating an engine torque based on the throttle opening degree and the number of revolutions of the engine, and wherein when said driven wheel speed is between said slip reference value and another slip reference value, which is smaller than said slip reference value, said initial engine torque selecting means selects lower one of the engine torque calculated by said engine torque calculating means and the required engine torque calculated by said required-engine torque calculating means.

* * * * *